United States Patent [19]

Nakamichi

[11] Patent Number: 4,951,163
[45] Date of Patent: Aug. 21, 1990

[54] MAGNETIC RECORDING AND REPRODUCING APPARATUS

[75] Inventor: Niro Nakamichi, South Laguna, Calif.

[73] Assignee: Nakamichi Corporation, Tokyo, Japan

[21] Appl. No.: 276,394

[22] Filed: Nov. 25, 1988

[30] Foreign Application Priority Data

Nov. 27, 1987 [JP] Japan .................. 62-299535

[51] Int. Cl.⁵ .................. G11B 5/027; G11B 15/60
[52] U.S. Cl. .................. 360/85; 360/95; 360/130.21
[58] Field of Search ..... 360/85, 84, 95, 130.22–130.23

[56] References Cited

U.S. PATENT DOCUMENTS 4,837,646 6/1989 Nagai .................. 360/85
4,875,126 10/1988 Nakamichi .................. 360/130.23

Primary Examiner—John H. Wolff
Attorney, Agent, or Firm—Oblon, Spivak, McClelland, Maier & Neustadt

[57] ABSTRACT

A magnetic tape is withdrawn from a tape cassette, wound partly around a rotatable drum with transducer heads through a predetermined wrap angle, and fed along for recording signals on and reproducing signals from the tape with the transducer heads. A pair of skew blocks is fixedly disposed laterally of and near the rotatable drum. A pair of vertical guide rollers is movable from a first position in which they are positioned within an opening defined in the tape cassette and behind the tape in the opening to a second position near the skew blocks. When the vertical guide rollers are moved from the first position to the second position, the vertical guide rollers withdraw the magnetic tape from the tape cassette and hold the magnetic tape against the rotatable drum and the skew blocks. The magnetic tape extending between the skew blocks is skewed by the skew blocks to allow the transducer heads to scan the magnetic tape at a prescribed skew angle. When the vertical guide rollers are in the first position, the distance between the axes of the respective vertical guide rollers is 15 mm or less.

1 Claim, 11 Drawing Sheets

MAGNETIC RECORDING AND REPRODUCING APPARATUS

BACKGROUND OF THE INVENTION

1. Field of the Invention:

The present invention relates to a magnetic recording and reproducing apparatus suitable for use as a digital audio tape recorder (hereinafter referred to as a "DAT"), for example.

2. Description of the Prior Art:

FIG. 15 of the accompanying drawings illustrates a conventional DAT including a rotatable drum 407 having magnetic heads, the drum 407 being inclined at an angle to a reference surface (i.e., a chassis surface) which lies perpendicularly to shafts for tape reels. In the DAT, a tape transport path is established as follows: A magnetic tape T unreeled from a supply reel 401 in a tape cassette 400 passes around a guide 402 fixed to a chassis 418, a pin 403 mounted on a tension arm, a guide 404 fixed to the chassis 418, and a vertical guide roller 405, is then angularly adjusted by an upstream inclined guide 406 so as to be wound partly around the rotatable drum 407, and goes around the drum 407. The tape T which has left the drum 407 is angularly adjusted back by a downstream inclined guide 408, goes around a vertical guide roller 409 and a guide 410 fixed to the chassis 418, passes between a capstan 411 and a pinch roller 412 pressed thereagainst and between a swing guide roller 413 and a fixed guide 414, and is finally wound around a takeup reel 415 in the tape cassette 400.

The vertical guide roller 405 and the inclined guide 406 are fixedly mounted on a guide base 416, and the vertical guide roller 409 and the inclined guide 408 are fixedly mounted on a guide base 417. The guide bases 416, 417 are movable in and along guide grooves 419, 420, respectively, defined in the chassis 418 by means of a suitable drive mechanism for pulling the tape T out of the tape cassette 400 and winding the tape T partly around the drum 407.

The guide bases 416, 417 are pressed respectively against stoppers 421, 422 fixed to the chassis 418 for establishing tape loading positions of the vertical guide rollers 405, 409 and the inclined guides 406, 408 with respect to the drum 407, thus defining a highly accurate tape transport path.

In a tape unloading position, the distance between the axes of the vertical guide rollers 405, 409 fixed to the respective guide bases 416, 417 is 20 mm or more.

When loading the tape T from the tape cassette 400 into the tape recorder with the vertical guide roller 405 and the inclined guide 406 on the guide base 416 and also with the vertical guide roller 409 and the inclined guide 408 on the guide base 417, the tape T tends to move transversely thereof along the inclined guides 406, 408 due to engagement with the inclined guides 406, 408. Insofar as the tape T is loaded at a low speed, the tape T will not be disengaged from the inclined guides 406, 408 because the tape T is transversely limited by flanges on the vertical guide rollers 405, 409. Since the forces tending to move the tape T transversely along the inclined guides 406, 408 increase as the speed at which the tape T is loaded is increased, however, when the tape T is loaded at a high speed, the tape T may be disengaged from the inclined guides 06, 408. Therefore, it has been difficult to rely on high-speed tape loading. Another problem is that the tape limiting flanges of the vertical guide rollers 405, 409 are responsible for damage to the tape T. When the tape T is loaded while being held in contact with the inclined guides 406, 408, the tape T is subjected to different longitudinal tensions across the width thereof, resulting in localized longitudinal stretching of the tape T.

In the tape unloading position, the inclined guides 406, 408 are disposed between the vertical guide rollers 405, 409 on the guide bases 416, 417, and hence the distance between the axes of the vertical guide rollers 405, 409 is 20 mm or more. Therefore, the pinch roller 412 and the swing guide roller 413 which are positioned behind the tape and displaceable by angularly movable links in the tape unloading position are disposed near the outer side of an opening in the cassette in the transverse direction thereof. Thus, the pivot point of the link is located near an outer edge of the magnetic recording and reproducing apparatus, which is rendered wide in overall dimensions.

As described above, the tape loading positions of the vertical guide rollers 405, 409 and the inclined guides 406, 408 with respect to the drum 407 for establishing a high-precision tape transport path are determined by pressing the guide bases 416, 407 respectively against the stoppers 421, 422 fixed to the chassis 418. The tape transport path is thus governed by the accuracy of positioning of the guide bases 416, 417. To position the guide bases 416, 417 highly accurately, it is necessary to meet desired levels for the shape and machining accuracy of the guide bases 416, 417 and the stoppers 421, 422 and also for the positional accuracy of the attached stoppers 421, 422 with respect to the chassis 418. Meeting all of these accuracy requirements however involves an increased cost. The tape transport path tends to gradually vary since the positional accuracy of the guide bases 416, 417 is lowered with time.

SUMMARY OF THE INVENTION

It is an object of the present invention to provide a magnetic recording and reproducing apparatus which is capable of loading a magnetic tape with guide bases having vertical guide rollers only.

Another object of the present invention is to provide a magnetic recording and reproducing apparatus which is so compact that it can be made portable.

Still another object of the present invention is to provide a magnetic recording and reproducing apparatus which can establish a tape transport path without being affected by the accuracy of the tape loading positions of vertical guide rollers.

Yet another object of the present invention is to provide a magnetic recording and reproducing apparatus which can load a magnetic tape at a high speed.

According to the present invention, a magnetic recording and reproducing apparatus for recording signals on and reproducing signals from a magnetic tape in a tape cassette has a rotatable drum having transducer heads for recording signals on and reproducing signals form the magnetic tape, a mechanism for winding the magnetic tape partly around the rotatable drum through a predetermined angle, and a capstan and a pinch roller pressable against the capstan for feeding the magnetic tape. The mechanism comprises a pair of skew blocks fixedly disposed laterally of the rotatable drum for guiding the magnetic tape at a magnetic layer surface thereof around the rotatable drum in order to allow the transducer heads to scan the magnetic layer surface at a predetermined skew angle, and a pair of vertical guide rollers movable from a first position in which the vertical guide rollers are located in an opening in the tape cassette behind a back surface of the magnetic tape opposite to the magnetic layer surface toward a second position in which the vertical guide rollers are located near the skew blocks, respectively, for withdrawing the magnetic tape from the tape cassette and holding the magnetic layer surface of the magnetic tape against the rotatable drum and the skew blocks. The pinch roller is movable from a position in which the pinch roller is located behind the back surface of the magnetic tape within the opening toward a position in which the pinch roller is pressed against the capstan. The vertical guide rollers having respective axes spaced from each other by a distance of 15 mm or less when the vertical guide rollers are in the first position.

When the vertical guide rollers and the pinch roller are moved from a tape unloading position behind the back surface of the magnetic tape in the tape cassette to a tape loading position in which the vertical guide rollers and the pinch roller are pressed against stoppers and the capstan, respectively, the magnetic layer surface of the magnetic tape is held against the skew block which is located upstream of the rotatable drum, and the magnetic tape is angularly oriented or skewed from its original angle by the skew block and wound partly around the rotatable drum. The magnetic tape which has left the rotatable drum is angularly reoriented back to its original angle by the skew block which is positioned downstream of the rotatable drum while the magnetic layer surface of the tape is being held against the skew block. The magnetic tape is fed by the capstan and the pinch roller pressed theregainst.

The skew blocks are fixedly disposed near the rotatable drum for guiding the magnetic tape at its magnetic layer surface around said rotatable drum in order to allow the transducer heads to scan the magnetic layer surface at a predetermined skew angle. Therefore, the magnetic tape can be loaded in place by guide bases which have the vertical guide rollers only. The magnetic tape which is guided by the vertical guide rollers only is not damaged and/or locally stretched along side edges, and hence has a long service life. The skew blocks are fixedly disposed in the vicinity of the rotatable drum, and hence no inclined guides are interposed between the vertical guide rollers in the tape unloading position. Therefore, the vertical guide rollers can be located very closely to each other with the distance between their axes being 15 mm or less. In the tape unloading position, the pinch roller and guide rollers which are displaceable by angularly movable links may be located near the center of the opening in the tape cassette, and the pivot points of the links may be located closely the center of the apparatus. The magnetic recording and reproducing apparatus is thus rendered compact in size.

With the skew blocks used, a strict requirement is no longer imposed on the positional accuracy of the vertical guide rollers, and hence the cost of the magnetic recording and reproducing apparatus is held to a minimum. In addition, the tape transport path does not gradually vary with time.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
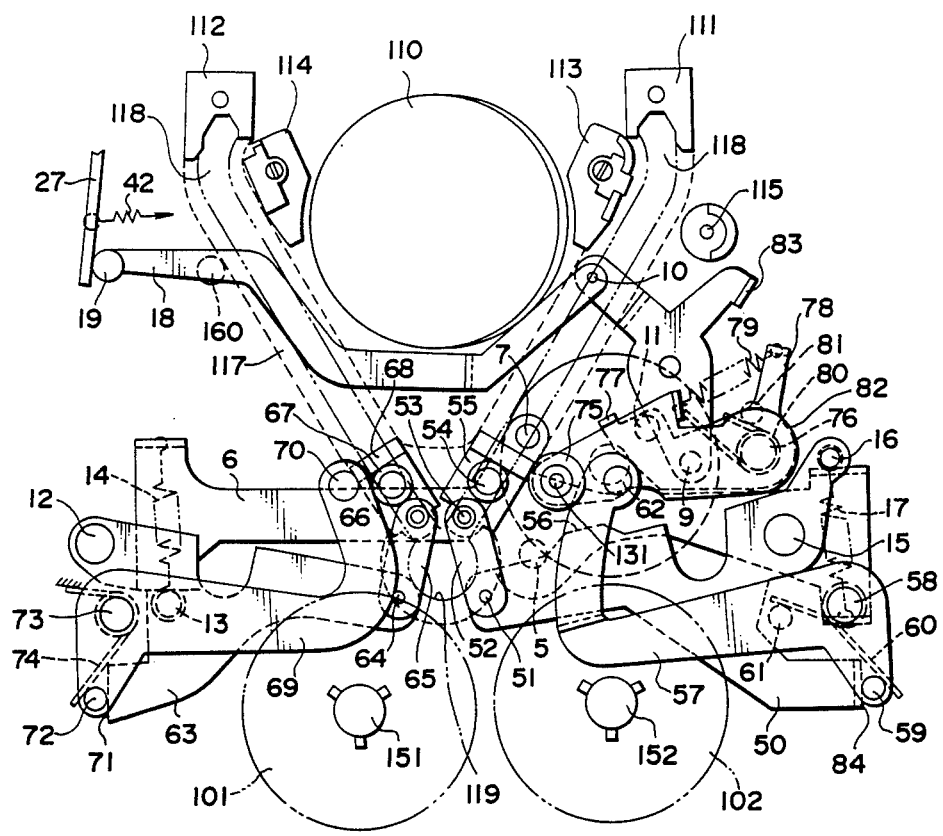
FIG. 1 is a plan view of a magnetic recording and reproducing apparatus according to the present invention.

FIGS. 12(a) through 12(d) show a tape cassette 200 for use in a magnetic recording and reproducing apparatus according to the present invention. The tape cassette 200 has therein a supply reel (not shown) for unreeling and supplying a magnetic tape T and a takeup reel (not shown) for winding the supplied magnetic tape T. The tape cassette 200 includes cassette casing 201 and typically has a width w of 73 mm, a depth d of 54 mm, and a height h of 10.5 mm. A front lid 204 is angularly movably mounted on a front edge of the cassette casing 201 by means of opposite pins 202, 203. A slider 205 is slidably disposed on the bottom surface of the cassette casing 201 for sliding movement selectively in the directions of the arrows A, B. When the slider 205 is slid in the direction of the arrow A, holes 206, 207 defined in the slider 205 are brought into corresponding relation to hub insertion holes 208, 209, respectively, defined in the cassette casing 201. Reel shafts (described later) are then inserted through the hub insertion holes 208, 209 into engagement with hubs 221, 222 of the supply and takeup reels. The slider 205 is normally urged to move in the direction of the arrow B by means of a spring (not shown). The slider 205 can selectively be moved into the positions shown in FIGS. 12(c) and 12(d) and locked in these positions by slider lock mechanisms 210, 211.

Figure 12A:
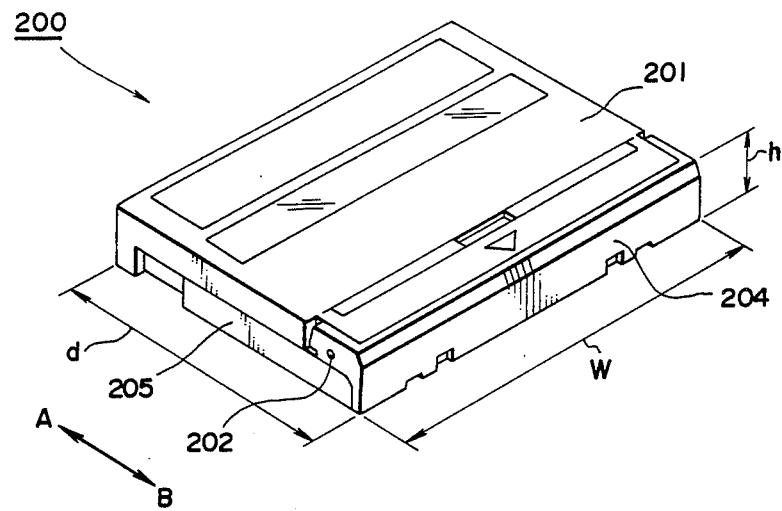
FIGS. 12(a) through 12(d) are a perspective view showing an upper side of a tape cassette for use in the magnetic recording and reproducing apparatus, a perspective view showing the upper side of the tape cassette with a front lid open, a perspective view showing a lower side of the tape cassette, and a bottom view of the tape cassette with a slider slid and the front lid turned.
Figure 12B:
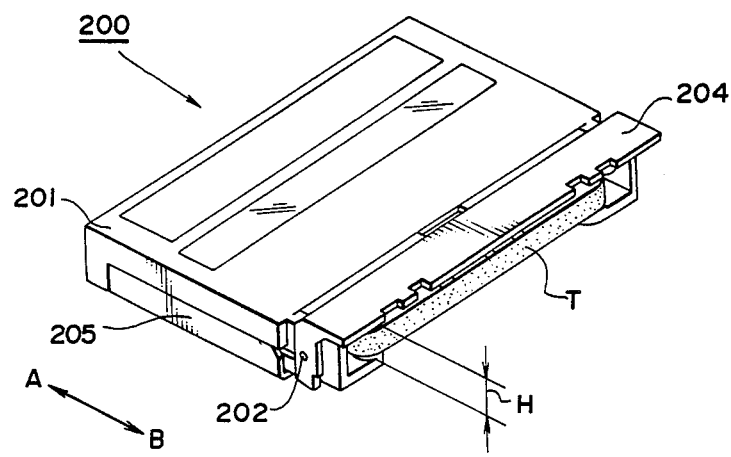
Figure 12C:
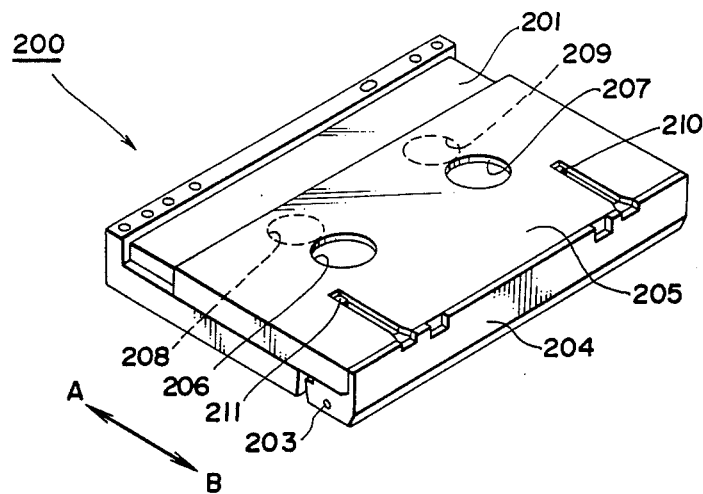
Figure 12D:
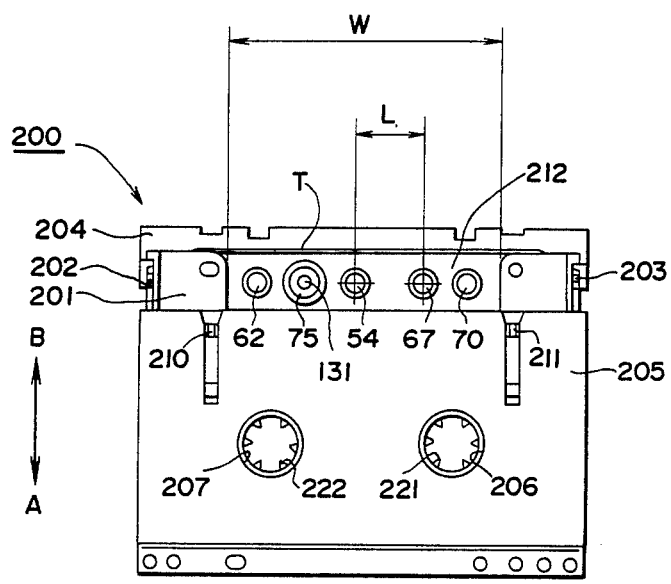

As shown in FIG. 12(d), the tape cassette 200 has an opening 212 which is normally covered by the front lid 204 and the slider 205. The opening 212 is exposed as shown when the slider 205 is slide in the direction of the arrow A and the front lid 204 is turned away from the front edge of the cassette casing 201. At this time, the tape T on the front edge of the cassette casing 201 has its magnetized surface facing outwardly away from the cassette casing 201 and its rear base surface facing toward the opening 212. The opening 212 typically has a width W of about 45 mm and a height H of about 8.5 mm.

When the tape cassette 200 is moved from a cassette eject position into a cassette operating position by a cassette loading mechanism, guide rollers and pinch rollers (described later) are inserted into the opening 212 and positioned in confronting relation to the base surface of the tape T.

As illustrated in FIG. 1, the magnetic recording and reproducing apparatus has a rotatable drum 110 with its centralaxis tape T.

As illustrated in FIG. 1, the magnetic recording and reproducing apparatus has a rotatable drum 110 with its central axis inclined and having magnetic transducer heads for recording signals on and reproducing signals from a magnetic tape, a pair of skew blocks 113, 114 fixed to a chassis (not shown) and disposed laterally on the opposite sides of the drum 110 for winding the tape partly around the drum 110 while skewing the tape at a certain angle to allow the transducer heads to scan the tape at a predetermined skew angle, and a pair of stoppers 111, 112 fixed to the chassis obliquely behind the skew blocks 113, 114 for positioning guide bases (described later).

Figure 13:
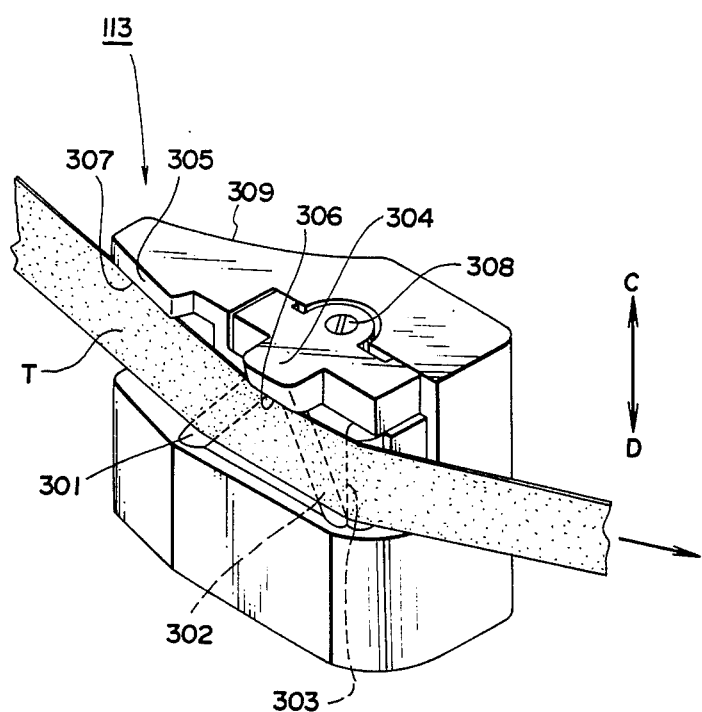
FIG. 13 is a perspective view of an skew block.

The skew block 113 disposed downstream of the drum 110 with respect to a tape transport path will be described with reference to FIG. 13 The skew block 113 is positioned in the tape transport path between the rotatable drum 110 and the guide roller 54. The skew block 113 has a first tape guide 301, a second tape guide 302, and a third tape guide 303 formed integrally on a front surface of the skew block 113 and arranged along the tape transport path. The first and second tape guides 301, 302 are oriented such that they are inclined with respect to the chassis when the skew block 113 is fixedly mounted on the chassis. The third tape guide 303 is oriented such that it is perpendicular to the chassis when the skew block 113 is fixedly mounted on the chassis. Each of the tape guides 301, 302, 303 is formed as a semicylindrical ridge.

The edges and surfaces of the tape T running around and from the inclined drum 110 are not parallel and normal to the chassis. However, as the tape T is guided by the first and second tape guides 301, 302, the edges and surfaces of the tape T are reoriented so as to be parallel and normal, respectively, to the chassis. The vertically oriented third tape guide 303 prevents the angle at which the tape T runs around the second tape guide 302 from being varied even if the position of a guide roller 54 (described later) on the chassis is varied.

A first edge limiting member 304 having a first edge limiting surface 306 on its lower side is slidably mounted on an upper surface of the skew block 113, the first edge limiting member 304 being slidable in the directions of the arrows C, D. The first edge limiting member 304 is fastened to the skew block 113 by a vertical screw 308 with its head exposed on the upper surface of the first edge limiting member 304. Therefore, the edge limiting surface 306 can be moved selectively in the directions of the arrows C, D while being kept parallel to the chassis, by turning the screw 308. The first edge limiting member 304 thus allows the tape T to be adjusted transversely in the tape transport path.

The skew block 113 has a second edge limiting member 305 disposed upstream of the first tape guide 301 and overhanging the chassis. The second edge limiting member 305 has a second edge limiting surface 307 on its lower side. The distance between the second edge limiting surface 307 and the chassis is larger than the distance between the first edge limiting surface 306 and the chassis. Therefore, while the tape T is running normally, the upper edge of the tape T slidably engages the first edge limiting surface 306, but is not held in sliding engagement with the second edge limiting surface 307. If the tape T suffers an abnormal running condition and happens to be disengaged from the first edge limiting surface 306, the second edge limiting surface 307 limits the edge of the tape T to retain the tape T on the skew block 113 against dislodgement.

The skew block 113 has an arcuate recess 309 defined in its back and having a concave surface which has substantially the same curvature as that of the outer circumferential surface of the drum 110. The skew block 113 has a substantially wedge-shaped upper surface and is located complementarily in a similar wedge-shaped space which is defined between the outer circumferential surface of the drum 110 and the tape T as it leaves the drum 110. The recess 309 defined in the back of the skew block 113 extends in a range from the first tape guide 301 to the second edge limiting member 305, making it possible to position the skew block 113 closely to the drum 110.

The skew block 114 disposed upstream of the drum 110 is substantially the same in construction as the skew block 113 except that first and second tape guides are inclined with respect to the chassis in opposite relation to those of the skew block 113.

As shown in FIG. 1, a supply reel rotor 101 and a takeup reel rotor 102, which are laterally spaced from each other as shown, have respective reel shafts 151, 152 for engaging the reels in the tape cassette. A guide lever 57 is angularly movably supported on a shaft 58 on the righthand side of the rotor 102, and a guide lever 69 is angularly movably supported on a shaft 73 on the lefthand side of the rotor 101 The guide levers 57, 69 are of a sickle shape, and have respective guide rollers 62, 70 mounted on their distal ends, and respective connector pins 59, 72 mounted on one sides of their proximal ends mounted on the shafts 58, 73. The guide lever 57 is normally urged to turn clockwise by a torsion spring 60 acting between the connector pin 59 and a spring retainer 61. The guide lever 69 is normally urged to turn counterclockwise by a torsion spring 74 acting between the connector pin 72 and the chassis.

Tape loading levers 50, 63 are disposed in partly underlapping relation to the levers 57, 69, respectively. The tape loading levers 50, 63 are angularly movably supported on respective outer shafts 15, 12 and have distal ends directed inwardly toward each other. The tape loading levers 50, 63 also have abutment surfaces 84, 71, respectively, on their supported proximal ends. The connector pins 59, 72 on the guide levers 57, 69 are held in abutment against the abutment surfaces 84, 71, respectively, under the bias of the springs 60, 74 engaging the connector pins 59, 72. Connector plates 52, 65 are pivotally coupled to the distal ends of the tape loading levers 60, 63 by means of pivot pins 51, 64, respectively. The connector plates 52, 65 are also pivotally coupled to tape guide bases 55, 68, respectively, by means of pivot pins 53, 66, respectively. The guide bases 55, 68 have respective vertical guide rollers 54, 67. A guide pin 160 having a nonrotatable tape engaging surface is mounted on the chassis downwardly (as shown in FIG. 1) of the stopper 112, i.e., at a position displaced from the stopper 112 toward the tape loading lever 63.

Figure 4:
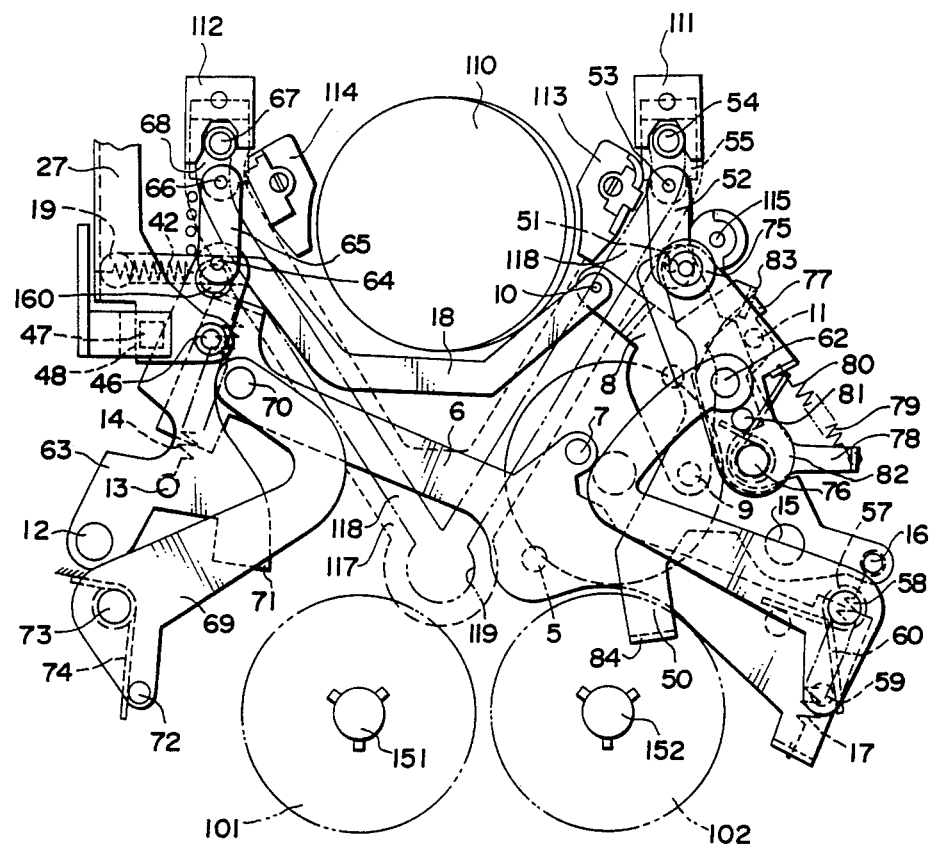
FIG. 4 is a plan view showing tape loading operation in the magnetic recording and reproducing apparatus.
Figure 7:
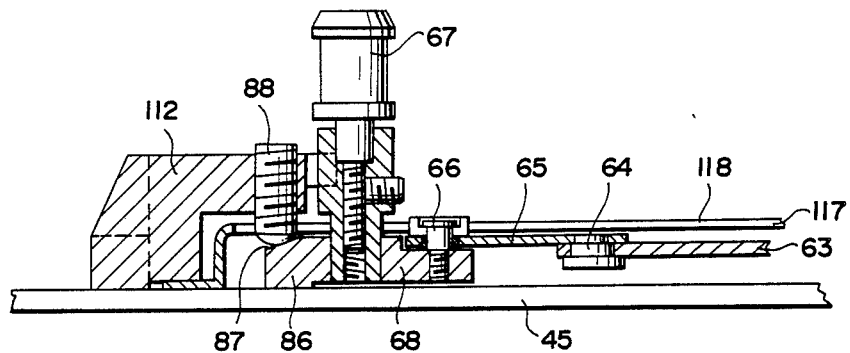
FIG. 7 is a vertical cross-sectional view of a tape guide base in the magnetic recording and reproducing apparatus.
Figure 8:
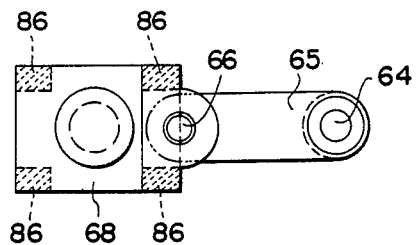
FIG. 8 is a bottom view of the tape guide base.

In FIGS. 7 and 8, the guide base 68 is movably disposed between the chassis, denoted at 45, and a substantially V-shaped guide base plate 117 fixed to the chassis 45 in vertically spaced relationship thereto. As shown in FIG. 4, the guide plate 117 has a substantially circular hole 119 and a V-shaped guide groove 118 extending from the circular hole 119 toward the opposite sides of the drum 110. The guide base 68 is inserted through the hole 119 into the guide groove 118 in which a base portion of the guide roller 67 and a head of the pivot pin 66 are fitted. The guide base 68 is movable along the guide groove 118 toward the stopper 112. The tape loading levers 50, 63 are disposed between the guide base plate 117 and the chassis, and the guide levers 57, 69 are disposed above the guide base plate 117. The guide base 68 has a slanted surface 87 on its upper leading portion thereof, and four sliding legs 86 on its lower surface. The stopper 112 for positioning the guide base 68 is of an inverted L-shaped vertical cross section and has a V-shaped receiver for receiving the base portion of the guide roller 67. An adjustment screw 88 is vertically threaded through the stopper 112 and a slot in the guide base plate 117 and has its lower tip end held against the slanted surface 87 of the guide base 68 for pressing the guide base 68 down against the chassis 45. The perpendicularity of the guide roller 67 is determined by the mutual positional relationship between the position where the adjustment screw 88 engages the slanted surface 87 and the position where the base portion of the guide roller 67 abuts against the V-shaped receiver of the stopper 112. Therefore, the perpendicularity of the guide roller 67 can be adjusted by turning the adjustment screw 88. The guide base 68 are held in sliding contact with the chassis 45 through the four sliding legs 86. However, the guide base 68 may be more stably held in sliding contact with the chassis 45 through three such sliding legs. While the guide base 68 and the stopper 112 which are located upstream of the drum 110 on a tape supply side for supplying the tape T has been described, the guide base 55 and the stopper 111 which are located downstream of the drum 110 on a tape takeup side for receiving the tape T are identical in construction to the guide base 68 and the stopper 112.

Since the guide groove 118 for guiding the guide bases 68, 55 is not defined directly in the chassis 45, but in the guide base plate 117 fixed to the chassis 45, the mechanical strength of the chassis 45 is prevented from being lowered.

Figure 2:
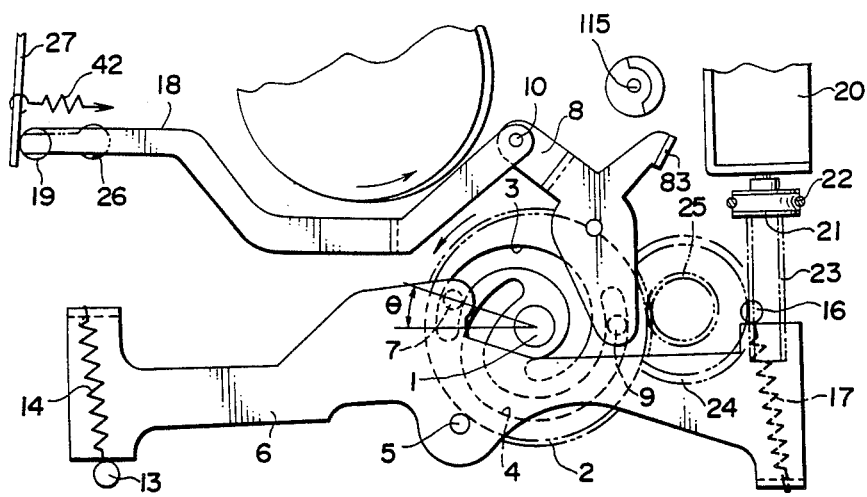
FIG. 2 is a plan view of a rotary cam and associated parts in the magnetic recording and reproducing apparatus.

As shown in FIGS. 1 and 2, a laterally extending main turn lever 6 is disposed below the tape loading levers 50, 63. The main turn lever 6 is angularly movable about a shaft 5 positioned centrally in its length. The main turn lever 6 has a pin 7 mounted thereon relatively closely to the shaft 5 and fitted a cam groove 3 defined in a rotary cam 2. A tension spring 17 is coupled between a righthand side end of the main turn lever 6 and a pin 16 mounted on the tape loading lever 50 near the shaft 15. The pin 16 is normally urged against a lateral upper (as shown in FIGS. 1 and 2) side of the lever 6 under the bias of the spring 17. When the lever 6 is turned clockwise about the shaft 5, the turning movement of the lever 6 is transmitted through the spring 17 to the lever 50 to turn the lever 50 clockwise in unison with the lever 6. Likewise, a tension spring 14 is coupled between a lefthand side end of the main turn lever 6 and a pin 13 mounted on the tape loading lever 63 near the shaft 12. The pin 13 is normally urged against a lateral lower (as shown in FIGS. 1 and 2) side of the lever 6 under the bias of the spring 14. When the lever 6 is turned clockwise about the shaft 5, the turning movement of the lever 6 is transmitted through the spring 14 to the lever 63 to turn the lever 63 counterclockwise in unison with the lever 6.

Figure 3:
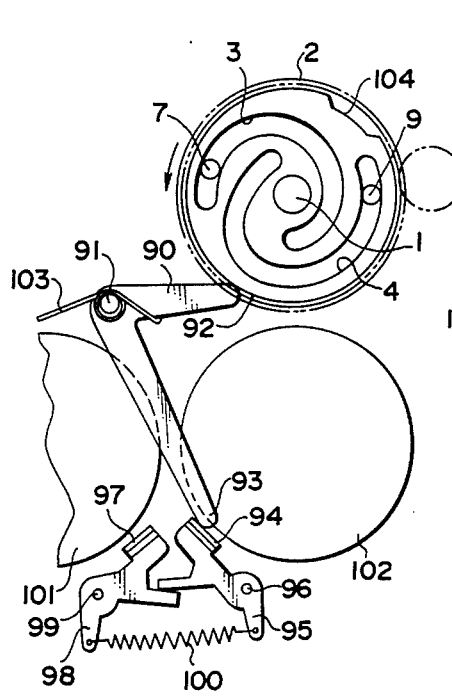
FIG. 3 is a plan view of a brake mechanism in the magnetic recording and reproducing apparatus.
Figure 5:
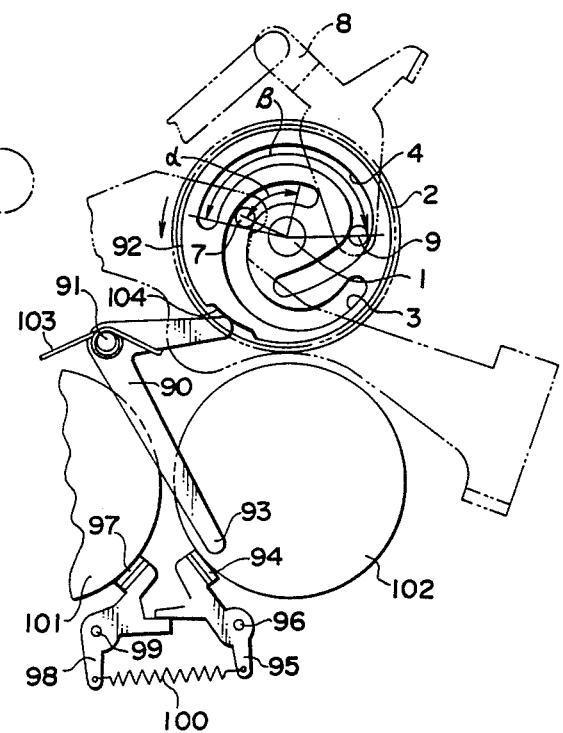
FIG. 5 is a plan view of a brake mechanism according to another embodiment.

As shown in FIGS. 2, 3, and 5, the rotary cam 2 is integral with a rotatable shaft 1 and has two spiral cam grooves 3, 4 defined in its upper surface. The cam groove 3 includes an outer portion having its radius of curvature remaining unchanged in an angular range subtending a relatively small angle $\theta$, an intermediate portion extending from the outer portion and having its radius of curvature made progressively smaller continuously, and an inner portion extending from the intermediate portion and having its radius of curvature remaining unchanged in an angular range subtending an angle $\alpha$. The cam groove 4 includes an outer portion having its radius of curvature remaining unchanged through an angle $\beta$ close to 180°, an intermediate portion extending therefrom and having its radius of curvature made progressively smaller, and an inner portion extending from the intermediate portion and having its radius of curvature remaining unchanged. The rotary cam 2 is rotated by a motor 20. As shown in FIG. 2, rotative power from the motor 20 is transmitted through a belt 22 and a pulley 21 to a worm 23, from which the rotative power is transmitted through a worm wheel 24 and a speed reducer gear 25 to the rotary cam 2. The pulley 21, the belt 22, the worm 23, the worm wheel 24, and the speed reducer gear 25 jointly serve as a speed reducer mechanism.

Figure 6:
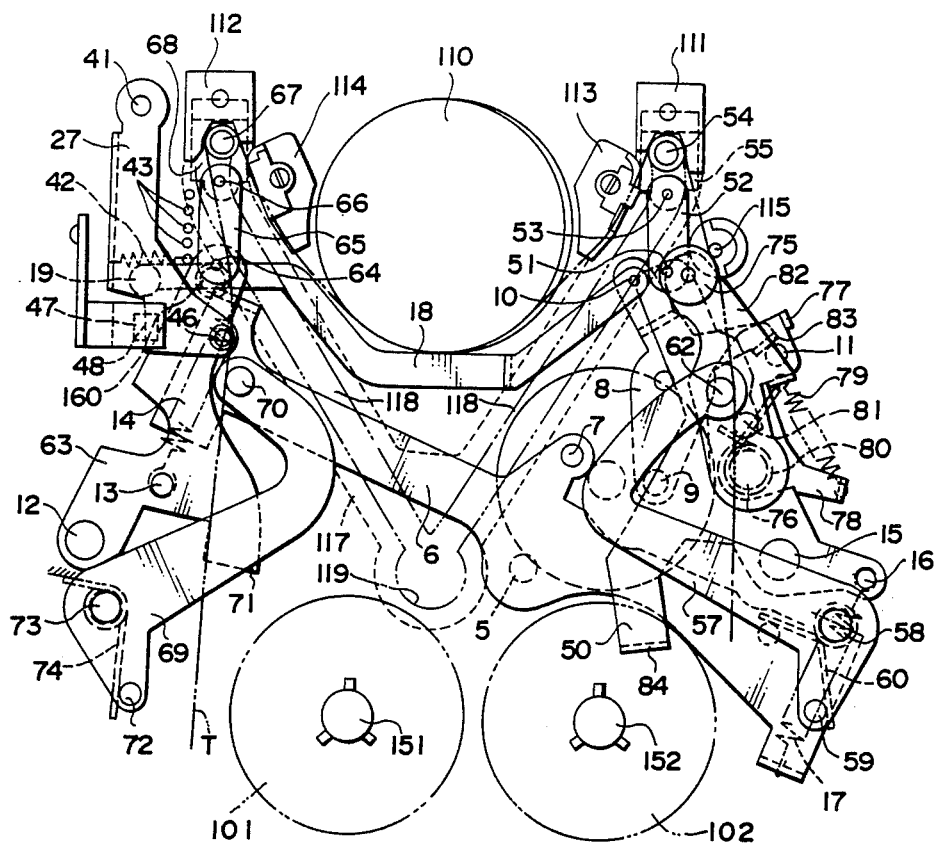
FIG. 6 is a plan view showing a playback mode of operation of the magnetic recording and reproducing apparatus.

In FIGS. 1 and 2, a pin 9 fixed to the end of an arm of a pinch roller pressing lever 8 is fitted in the cam groove 4 of the rotary cam 2. The lever 8 has three arms, one of which has its end pivotally coupled to one end of a release lever 18 by a coupling pin 10. Another arm of the lever 8 has a bent portion 83 on its end. The release lever 18 extends laterally in the vicinity of the drum 110, and has a pin 19 fixedly mounted on its lefthand end. The pin 19 confronts a bent edge of a tension lever 27. As shown in FIG. 6, the tension lever 27 is angularly movable about a shaft 41 and is normally urged to turn counterclockwise (FIG. 6) to hold the bent edge against the pin 19 under the bias of a spring 42. The chassis has an array of holes 43 for receiving one end of the spring 42. The force by which the lever 27 is urged under spring resiliency can be adjusted by selecting one of the holes 43 for holding one end of the spring 42. A tension roller 46 is mounted on a distal end of the tension lever 27, and can be moved into the tape transport path when the tension lever 27 is turned under the spring bias. The lever 27 has a recess 48 defined in an edge thereof, and a sensor 47 is fixed in a position overlapping the recess 48. The sensor 47 may comprise an optical sensor, for example, for detecting the angular position of the tension lever 27.

In FIGS. 1 and 4, a pinch roller pressing plate 78 and a pinch roller lever 82 are angularly movably supported on the chassis by a shaft 76 on the tape takeup side. The pinch roller lever 82 has a pinch roller 75 on its distal end and is normally urged to turn counterclockwise by a spring 80 acting between itself and a fixed spring retainer 81. When the pinch roller lever 82 is turned about the shaft 76 against the bias of the spring 80, the pinch roller 75 is pressed against a capstan 115. As described later on, the shaft 76 of the pinch roller lever 82 is positioned such that the path of movement of the pinch roller 75 crosses or overlaps the path of movement of the guide roller 54 when the pinch roller 75 substantially reaches an intermediate position in its stroke. Between the pinch roller lever 82 and the pinch roller pressing plate 78, there acts a tension spring 79 connected to the lever 82 at a position substantially intermediate between the pinch roller 75 and the shaft 76 for normally biasing the pressing plate 78 counterclockwise with respect to the lever 82. The pressing plate 78 has a bent engaging member 77 on its distal end which engages a side edge of the lever 82 under the resiliency of the spring 79 for causing the lever 82 and the pressing plate 78 to turn in unison temporarily. A pinch pressing plate 78. When the pressing plate 78 is turned clockwise as shown in FIG. 4, the pressing pin 11 is positioned laterally of the bent portion 83 of the pinch roller pressing lever 8. The pin 11 is positioned in the path of movement of a presser 56 projecting from the tape loading lever 50.

With the tape cassette 200 mounted in a tape unloading position shown in FIG. 1, the guide rollers 70, 67, 54, the pinch roller 75, and the guide roller 62 are positioned within the opening 212 of the tape cassette 200 on a straight line which is substantially parallel to the straight line interconnecting the reel shafts 151, 152, as shown in FIG. 12(d).

As shown in FIGS. 3 and 5, the rotary cam 2 has a braking recess 104 defined in an outer circumferential surface 92 thereof which has a constant radius. A braking lever 90 is angularly movably supported on a shaft 91 in the vicinity of the cam 2 and is normally urged to turn counterclockwise by a spring 103. The braking lever 90 has one arm with its outer end held in sliding contact with the outer circumferential surface of the cam 2 against further angular movement under the bias of the spring 103. Brake levers 98, 95 are angularly movable supported on the chassis by respective shafts 99, 96 near the supply reel rotor 101 and the takeup reel rotor 102, the brake levers 98, 95 having brake pads 97, 94, respectively, for pressing engagement with the outer circumferential surfaces of the rotors 101, 102. A tension spring 100 is coupled between the brake levers 98, 95 for normally urging the brake pads 97, 94 into pressing contact with the outer circumferential surfaces of the rotors 101, 102. The other arm of the braking lever 90 has an arm end 93 extending toward the brake pad 94 of the lever 95. When the opposite arm end of the lever 90 slidably engage the constant-radius surface 92 of the cam 2 as shown in FIG. 3, the arm end 93 pushes the brake pad 94 to turn the lever 95 against the bias of the spring 100, thus keeping the brake pad 94 off the reel rotor 102. The two brake levers 95, 98 are operatively interlinked through engagement of their projecting fingers. When the lever 95 is turned counterclockwise as shown in FIG. 3, the lever 98 is turned clockwise to move the brake pad 97 off the reel rotor 101. When the cam 2 is rotated to allow the arm end of the lever 90 to enter the recess 104 of the cam 2 as shown in FIG. 5, the arm end 93 disengages from the brake pad 94 permitting the levers 95, 98 to turn clockwise and counterclockwise, respectively. The brake pads 94, 97 are now brought into pressing engagement with the outer circumferential surfaces of the reel rotors 101, 102, respectively, thus braking the reel rotors 101, 102.

Figure 10:
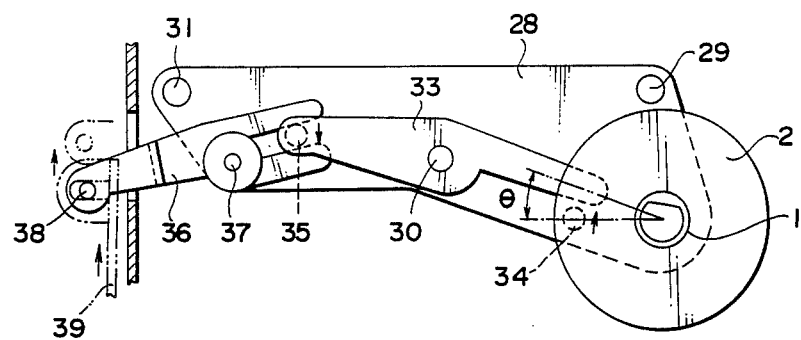
FIG. 10 is a plan view of an eject mechanism in the magnetic recording and reproducing apparatus.
Figure 11:
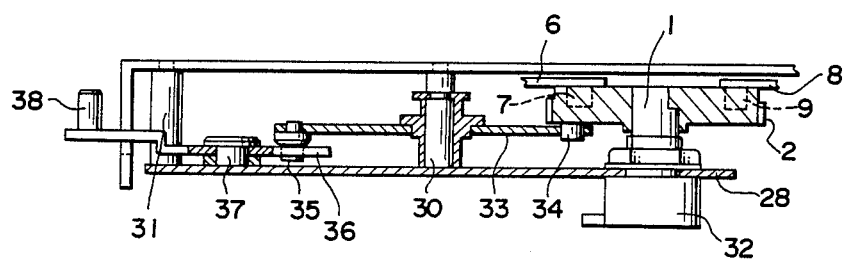
FIG. 11 is a vertical cross-sectional view of the eject mechanism.

As illustrated in FIGS. 10 and 11, a pin 34 is fixed to the lower surface of the rotary cam 2, and one end of an intermediate lever 33 is positioned in the path of movement of the pin 34. The lever 33 is angularly movably supported on a support plate 28 by a column 30, the support plate 28 being fixed to the chassis by means of the column 30 and other columns 29, 31. A pin 35 is fixedly mounted on the other end of the lever 33 and fitted in a fork on one end of a connecting lever 36 which is angularly movable about a shaft 37. The other end of the connecting lever 36 is coupled to an eject lever 39 through a pin 38. When the cam 2 is rotated clockwise in FIG. 10, the pin 34 turns the intermediate lever 33 counterclockwise to turn the connecting lever 36 clockwise, thus moving the eject lever 39 upwardly in FIG. 10. The tape cassette is now released and can be taken out of the magnetic recording and reproducing apparatus. As shown in FIG. 11, a potentiometer 32 is coupled to the shaft 1 of the cam 2 for detecting the angular position of the cam 2 to control the angular position thereof. The potentiometer 32 may be replaced with a rotary encoder.

Operation of the magnetic recording and reproducing apparatus thus constructed will be described below.

FIG. 1 shows the position of the parts with no tape cassette inserted, or before a tape is loaded. At this time, the rotary cam 2 is angularly positioned as shown in FIG. 2, with the pins 7, 9 positioned in the respective outer portions of the cam grooves 3, 4. As illustrated in FIG. 3, the braking lever 90 is turned by the outer circumferential surface 92 of the cam 2 against the spring bias to forcibly turn the brake levers 95, 98, releasing the reel rotors 101, 102.

When the tape cassette 200 is inserted, the slider 205 and the front lid 204 thereof are slid and turned, respectively, by mechanisms (not shown) in the magnetic recording and reproducing apparatus. The guide rollers 70, 67, 54, the pinch roller 75, and the guide roller 62 are inserted in mutual alignment into the opening 212 of the tape cassette 200, and positioned in confronting relation to the base surface of the tape T. The distance L between the axes of the guide rollers 54, 67 at this time is about 11 mm. If the vertical guide rollers and inclined guides were disposed on the guide bases as is conventional, the distance between the axes of the vertical guide rollers in a tape unloading position would have to be at least 20 mm since the inclined guides would be disposed between the vertical guide rollers. According to the present invention, however, since only the vertical guide rollers 54, 67 are mounted on the respective guide bases 55, 68, the distance between the axes of the vertical guide rollers 54, 67 is very small, i.e., about 11 mm, as described above. The pivot points of the links for moving the guide rollers 54, 67 and the like can therefore be located closely to the center of the magnetic recording and reproducing apparatus, which can therefore be made compact in size. For making the apparatus compact in its entirety, however, it is sufficient for the distance between the axes of the guide rollers 54, 67 in the tape unloading position to be 15 mm or less.

Then, the motor 20 is energized, from the tape unloading position, to rotate the rotary cam 2 counterclockwise about the shaft 1 through the speed reducer mechanism 21, 22, 23, 24, 25. In a certain initial angular range of movement of the cam 2, the outer portion of the cam groove 4 in which the pin 9 is fitted remains unchanged in radius of curvature, and hence the pinch roller pressing lever 8 is not turned. The intermediate portion of the cam groove 3 in which the pin 7 is fitted becomes progressively smaller in radius of curvature from the initial phase of rotation of the cam 2, so that the pin 7 is shifted radially toward the shaft 1 turning the main turn lever 6 clockwise in FIG. 1. Since the distance from the shaft 5 to the pin 7 is small with respect to the entire length of the lever 6, the stroke of movement of the opposite ends of the lever 6 at this time is considerably large. The turning movement of the lever 6 is transmitted through the spring 17 to the tape loading lever 50, and also through the spring 14 to the tape loading lever 63. The lever 50 is turned clockwise and the lever 63 is turned counterclockwise in unison with the lever 6. The angular movement of the levers 50, 63 causes the connector plates 52, 65 to push the guide bases 55, 68 along the guide groove 118 toward the stoppers 111, 112.

Upon the angular movement of the levers 50, 63, the abutment surfaces 84, 71 of the levers 50, 63 are displaced from abutment against from the pins 59, 72, respectively, allowing the guide levers 57, 69 to turn clockwise and counterclockwise, respectively, together with the levers 50, 63 under the bias of the springs 60, 74. The guide rollers 62, 70 are now moved with the levers 57, 69, and the guide rollers 54, 67 are also moved with the guide bases 55, 68, for thereby pulling the tape T from the tape cassette.

Figure 14A:
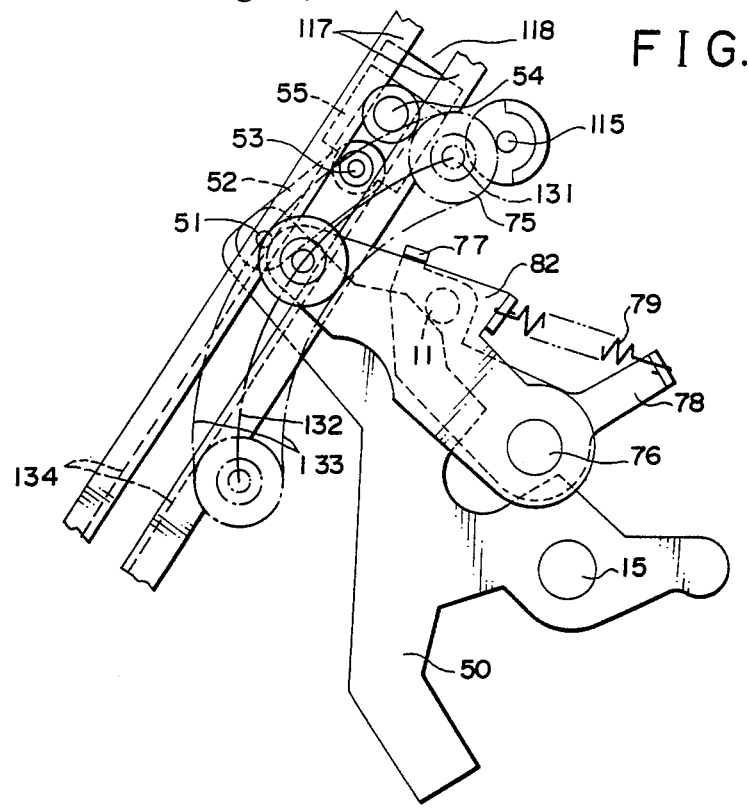
FIGS. 14(a) and 14(b) are plan and cross-sectional views illustrating the manner in which a pinch roller moves.
Figure 14B:
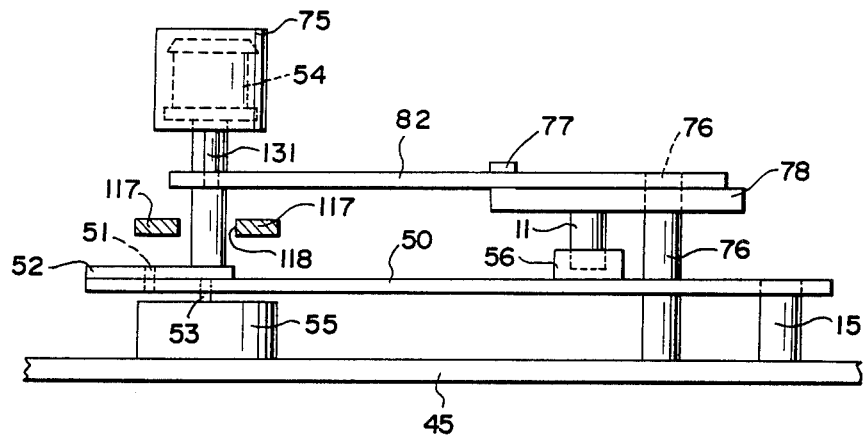
Figure 15:
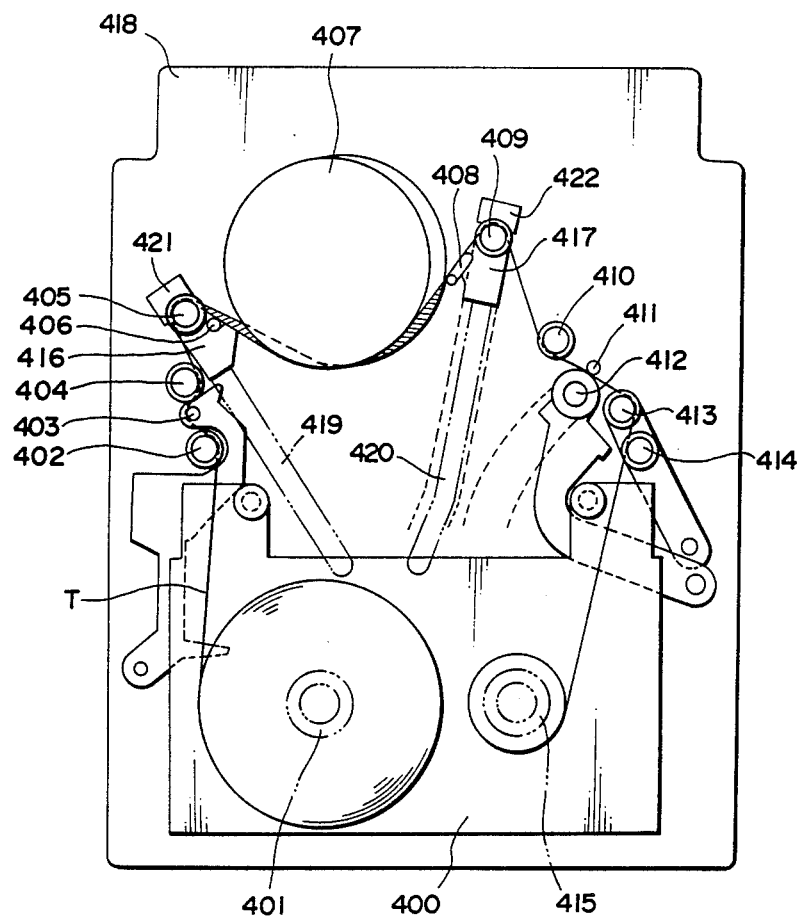
FIG. 15 is a plan view of a conventional magnetic recording and reproducing apparatus.

Movement of the pinch roller 75 will be described in detail with reference to FIGS. 14(a) and 14(b). When the tape loading lever 50 is turned through a prescribed angle, the presser 56 engages and pushes the pin 11 on the pinch roller pressing plate 78 to turn the latter clockwise about the shaft 76. The clockwise turning movement of the pinch roller pressing plate 78 permits the pinch roller lever 82 to turn clockwise in unison with the pressing plate 78 under the bias of the spring 79. The pinch roller 75 now moves along a path 133 toward a two-dot-and-dash-line position where it is pressed against the capstan 115. Similarly, the central axis 131 of the pinch roller 75 moves along a path 132. On the movement along the path 133 the pinch roller 75 crosses a path 134 of movement of the guide roller 54 as indicated by the solid line. The pinch roller 75 starts moving along the path 133 when the presser 56 of the tape loading lever 50 pushes the pin 11 after the presser 56 has turned a certain angle from the unloading position. Therefore, when the pinch roller 75 is positioned on the path 134 of movement of the guide roller 54, the guide roller 54 has already been moved ahead of the pinch roller 75 on the path 134. The pinch roller 75 and the guide roller 54 are thus kept out of physical interference with each other. The guide base plate 117 is not provided on the path of movement of the pin 11, and hence does not interfere with the engagement between the pin 11 and the presser 56. As shown in FIG. 4, the pin 11 on the lever 82 is positioned laterally of the bent portion 83 of the pinch roller pressing lever 8.

The guide bases 55, 68 are moved until the respective guide rollers 54, 67 abut against the stoppers 111, 112, respectively, as shown in FIG. 4. When the guide bases 55, 68 reaches the position of FIG. 4, the tape extending between the guide rollers 54, 67 is wound partly around the outer circumferential surface of the drum 110 through about 90°. The guide rollers 62, 70 on the guide levers 57, 69 are positioned obliquely laterally of the drum 110 for guiding the tape along a predetermined tape transport path. After the tape guide bases 55, 68 has engaged the respective stoppers 111, 112, the main turn lever 6 is further turned to stretch the springs 17, 14 for pressing the guide bases 55, 68 against the stoppers 111, 112 under the bias of the springs 17, 14. The pinch roller 75 is moved into a position near the capstan 115 by the presser 56 of the tape loading lever 50, but still remains spaced from the capstan 115.

The magnetic recording and reproducing apparatus is positioned in a stop mode as shown in FIG. 4. The rotary cam 2 is rotated about 180° until the arm end of the lever 90 enters the recess 104 of the cam 2, as shown in FIG. 5, whereupon the reel rotors 101, 102 are braked as described above.

The cam 2 is further rotated counterclockwise from the position illustrated in FIG. 5. The pin 7 then goes into the constant-radius inner portion of the cam groove 3 which is subtended by the angle c, so that the main turn lever 6 is not turned from the position of FIG. 4, and hence the guide rollers 54, 67, 62, 70 remains in the position of FIG. 4. The pin 9 enters the intermediate portion of the cam groove 4 which becomes progressively smaller in radius of curvature, so that the pinch roller lever 8 is turned clockwise in FIG. 6 to enable the bent portion 83 to press the pin 11 on the lever 82. The pinch roller 75 is therefore pressed against the capstan 115 to feed the tape at a constant speed between the pinch roller 75 and the capstan 115. While the pinch roller 75 is being pressed against the capstan 115, the guide bases 55, 68 remain immovable, and the guide rollers 54, 67 are pressed against the respective stoppers 111, 112 under the same forces. While the cam 2 is rotating as described, the braking lever 90 is turned clockwise in FIG. 5 by being pushed by the constant-radius surface 92 of the cam 2, releasing the reel rotors 101, 102 from the braked condition.

The magnetic recording and reproducing apparatus is now operated in a playback mode as shown in FIG. 6. The clockwise turning motion of the lever 8 displaces the lever 18 to the right to move the pin 19 away from the tension lever 27. The tension lever 27 is turned counterclockwise in FIG. 6 under the resiliency of the spring 42 to press the tension roller 46 on the lever 27 against the tape T which is kept taut between the guide roller 70 and the guide pin 160. The angular position of the lever 27 depends on the tension to which the tape T is subjected. The angular position of the lever 27 is detected by the sensor 47, and a detected position signal from the sensor 47 is applied to a tension controller (not shown) for controlling the tension of the tape T. The tension controller may be arranged to control the speed of rotation of a motor for rotating the supply reel rotor 101 or to electromagnetically control the braking force applied to the supply reel rotor 101.

In the playback mode, the tape T is unreeled from the supply reel in the tape cassette 200, travels successively past the guide roller 70, the tension roller 46, the guide pin 160, the guide roller 67, the skew block 114, the drum 110, the skew block 113, the guide roller 54, the capstan 115 and the pinch roller 75, and the guide roller 62, and is wound around the takeup reel in the tape cassette 200.

Before the tape T reaches the skew block 114, the tape T runs with its side edges and surface being maintained respectively parallel and normal to the chassis. The skew block 11 then orients the tape T so that its side edges and surface are not parallel and normal to the chassis. The tape T thus oriented is wound partly around the drum 110. The tape T which has left the drum 110 is reoriented by the skew block 113 so that its side edges and surface are again maintained parallel and normal to the chassis.

A high-speed search mode for feeding the tape T rapidly until a desired position on the tape T reaches the drum 110. The high-speed search mode is effected when the cam 2 is turned clockwise slightly from the position shown in FIG. 5, i.e., when the parts of the magnetic recording and reproducing apparatus are positioned just prior to the stop position shown in FIG. 4 in the tape loading operation described above. In the high-speed search mode, the lever 90 releases the reel rotors 101, 102 from the braked condition, and, though the main turn lever 6 is turned slightly counterclockwise, the guide bases 55, 68 are pressed against the stoppers 111, 112, respectively, under the forces of the springs 14, 17 which still remain stretched. Since the pinch roller 75 is spaced from the capstan 115 at this time, the tape can be fed rapidly by rotating the reels at a high speed. A desired position on the tape can be brought quickly to the drum 110 in the high-speed search mode while reproducing signals recorded on the tape through the head on the drum 110.

Figure 9:
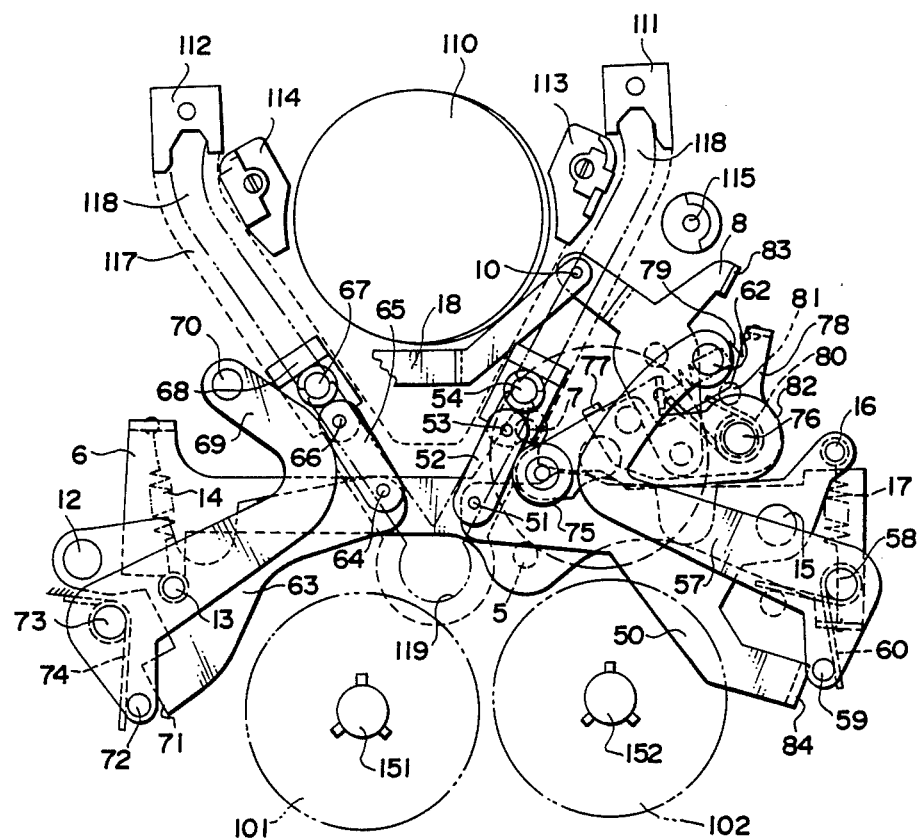
FIG. 9 is a plan view illustrating a high-speed search mode of operation of the magnetic recording and reproducing apparatus.

The high-speed search mode can feed the tape at a speed which may, for example, be 200 times the speed of travel of the tape in the normal playback mode. Now, an ultrahigh-speed search mode in which the tape can be fed at a speed which may, for example, be 400 times the normal playback speed will be described below. In the ultrahigh-speed search mode, the cam 2 is stopped in the tape loading process so that the parts are positioned as shown in FIG. 9. In FIG. 9, the guide rollers 54, 67, 62, 70 and the pinch roller 75 have not yet completed their strokes of movement, and the tape is not yet in contact with the drum 110. Therefore, since any load on the tape transport system is low, the tape can be fed highly rapidly by rotating the reels at a very high speed. The amount or length of the tape which has been fed in the ultrahigh-speed search mode is measured by counting the number of revolutions of the reel motor or the reel, and the feeding of the tape is stopped when a desired tape length has been fed. In the ultrahigh-speed search mode, the tape is held out of contact with the drum 110, and the magnetic head on the drum 110 cannot pick up any signal from the tape. Inasmuch as an exact desired position on the tape cannot be determined on the basis of any signal from the tape in the ultrahigh-speed search mode, therefore, the ultrahigh-speed search mode is followed by the high-speed search mode to determine the exact desired position on the tape.

Each time each of the various above operation modes of the magnetic recording and reproducing apparatus has been finished, the rotary cam 2 is returned to the stop position of FIG. 5 to brake the reel rotors 101, 102 for preventing the tape from being loosened.

An eject mode of operation will be described below. When an eject button (not shown) of the magnetic recording and reproducing apparatus is pressed, the rotary cam 2 is rotated clockwise to bring the components of the apparatus back to the original position shown in FIG. 1 through a process which is the reversal of the tape loading process described above. More specifically, the pinch roller 75 is moved away from the capstan 115, the guide rollers 54, 67 are moved away from the respective stoppers 111, 112 back to their initial position, and the guide rollers 62, 70 return to their initial position. The rotary cam 2 further turns clockwise from the original position of FIG. 2 through the angular range of $\theta$. In this angular range of $\theta$, the cam grooves 3, 4 have the same radii of curvature, and the guide rollers and the pinch roller remain in the position of FIG. 1. However, as illustrated in FIG. 10, the pin 34 on the cam 2 turns the intermediate lever 33 counterclockwise to turn the connecting lever 36 clockwise, thus moving the release lever 39 upwardly as viewed in FIG. 10. The movement of the release lever 39 releases the tape cassette from the locked and positioned condition, and ejects the tape cassette out of the magnetic recording and reproducing apparatus. After the tape cassette has been ejected, the cam 2 angularly returns to the position shown in FIG. 2.

In each of the various modes of operation, the rotary cam 2 has to be stopped in a prescribed angular position. The angular position in which the cam 2 is stopped can be detected by an output signal from the potentiometer 32 shown in FIG. 11.

With the embodiment described above, the main turn lever 6 is turned by the single cam, and the tape loading levers 50, 63 are turned in unison with the main turn lever 6 to move the tape guide bases 55, 68. It is not necessary to provide a ring gear around the rotatable drum 110, and hence the space around the rotatable drum 110 is not crowded with parts. Since the magnetic recording and reproducing apparatus includes a combination of movable levers, it is simple in mechanism, has a reduced number of parts, suffers a reduced friction loss, and can obtain large strokes of movement. With the fixed skew blocks 113, 114 employed for guiding the tape obliquely with respect to the drum 110, the guide rollers 54, 67 are required to traverse larger strokes than would be if inclined poles movable with the guide rollers 54, 67 were used for guiding the tape. Since the combination of levers can provide greater strokes of movement, such a requirement can be met without any problem.

The cam grooves 3, 4 in the cam 2 move the main turn lever 6, the lever 8, and their associated parts with smaller-radius cam groove portions rather than larger-radius cam groove portions. Accordingly, the cam grooves 3, 4 can produce larger forces to move these components than otherwise. The cam grooves 3, 4 are provided separately for moving the guide rollers 54, 67 and for moving the pinch roller 75. When pressing the pinch roller 75 against the capstan 115, therefore, the forces with which the guide rollers 54, 67 are pressed against the stoppers 111, 112 are not varied, but remain stable.

The present invention is not limited to the illustrated embodiment. Although each of the skew blocks 113, 114 is shown as comprising first through third tape guides, first and second tape edge limiting members, and a fixing means such as a screw, each skew block may include at least first and second tape guides. Where the illustrated skew blocks are employed, since any conventional inclined guides are dispensed with, the opening in the tape cassette placed in the tape unloading position provides a large space, and the guide rollers and the pinch roller which are to be positioned in the opening may have larger diameters. This is advantageous in that the loss of energy at the shafts of these rollers can be reduced. In the illustrated embodiment, the guide rollers are moved in advance of the pinch roller to avoid mutual physical interference therebetween in the tape loading process. However, magnetic recording and reproducing apparatus may be modified such that the pinch roller can be moved before the guide rollers are moved.

Although a certain preferred embodiment has been shown and described, it should be understood that many changes and modifications may be made therein without departing from the scope of the appended claim.

What is claimed is:

1. A magnetic recording and reproducing apparatus for recording signals on and reproducing signals from a magnetic tape in a tape cassette, comprising:
    a rotatable drum having transducer heads for recording signals on and reproducing signals from the magnetic tape;
    a mechanism for winding the magnetic tape partly around said rotatable drum through a predetermined angle;
    a capstan and a pinch roller pressable against said capstan for feeding the magnetic tape; and
    said mechanism comprising:
    a pair of skew blocks fixedly disposed laterally of said rotatable drum for guiding said magnetic tape at a magnetic layer surface thereof around said rotatable drum in order to allow said transducer heads to scan said magnetic layer surface at a predetermined skew angle;
    a pair of vertical guide rollers movable from a first position in which said vertical guide rollers are located in an opening in the tape cassette behind a back surface of said magnetic tape opposite to said magnetic layer surface toward a second position in which said vertical guide rollers are located near said skew blocks, respectively, for withdrawing the magnetic tape from the tape cassette and holding said magnetic layer surface of the magnetic tape against said rotatable drum and said skew blocks;
    said pinch roller being movable from a position in which the pinch roller is located behind said back surface of the magnetic tape within said opening toward a position in which said pinch roller is pressed against said capstan; and
    said vertical guide rollers having respective axes which are spaced from each by a distance of 15 mm or less when the vertical guide rollers are in said first position.

* * * * *